United States Patent [19]
Gras

[11] Patent Number: 5,939,199
[45] Date of Patent: *Aug. 17, 1999

[54] PROCESS FOR THE PREPARATION OF HEAT CURABLE WEATHER-RESISTANT POLYURETHANE POWDER COATINGS, AND THE COATINGS THUS OBTAINED

[75] Inventor: Rainer Gras, Bochum, Germany

[73] Assignee: Huels Aktiengesellschaft, Marl, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,032

[22] Filed: Mar. 26, 1997

[30] Foreign Application Priority Data

Mar. 26, 1996 [DE] Germany ............... 196 11 821

[51] Int. Cl.$^6$ ............... B32B 27/00; C08G 283/04
[52] U.S. Cl. ............... 428/422.8; 428/423.1; 428/425.8; 525/453; 525/934
[58] Field of Search ............... 525/453, 934; 428/422.8, 423.1, 425.8

[56] References Cited

U.S. PATENT DOCUMENTS

| | | | |
|---|---|---|---|
| 4,419,513 | 12/1983 | Breidenbach et al. | 544/222 |
| 4,482,721 | 11/1984 | Wegner et al. | 548/262 |
| 4,500,697 | 2/1985 | Disteldorf et al. | 528/45 |
| 4,748,242 | 5/1988 | Halpaap et al. | 544/222 |
| 5,112,931 | 5/1992 | Potter et al. | 528/45 |
| 5,237,058 | 8/1993 | Laas et al. | 540/202 |
| 5,252,617 | 10/1993 | Werner et al. | 521/56 |
| 5,523,377 | 6/1996 | Konig et al. | 528/45 |
| 5,580,660 | 12/1996 | Witte et al. | 428/422.8 |
| 5,596,064 | 1/1997 | Konig et al. | 528/45 |

FOREIGN PATENT DOCUMENTS

| | | |
|---|---|---|
| 0 004 571 | 10/1979 | European Pat. Off. . |
| 0 047 452 | 3/1982 | European Pat. Off. . |
| 0 132 518 | 2/1985 | European Pat. Off. . |
| 0 224 165 | 6/1987 | European Pat. Off. . |
| WO 93/23447 | 11/1993 | WIPO . |

*Primary Examiner*—Randy Gulakowski
*Attorney, Agent, or Firm*—Oblon, Spivak, McClelland, Maier & Neustadt, P.C.

[57] ABSTRACT

Polyurethane powder coating compositions of high reactivity, containing a) an isocyanate component which is partially or totally blocked with 1,2,4-triazole, b) hydroxyl-containing polymers, and c) if desired, customary auxiliaries and additives, where the isocyanate component is a physical mixture of individual trimers (isocyanato-isocyanurates) of aliphatic and (cyclo)aliphatic and/or cycloaliphatic diisocyanates provide heat curable weather resistant coatings.

20 Claims, No Drawings

PROCESS FOR THE PREPARATION OF HEAT CURABLE WEATHER-RESISTANT POLYURETHANE POWDER COATINGS, AND THE COATINGS THUS OBTAINED

BACKGROUND OF THE INVENTION

1. Field of the Invention

The present invention relates to a process for the preparation of transparent and pigmented, heat-curable, weather-resistant polyurethane (PU) powder coating materials (powder coatings) of high reactivity and to the coatings obtained in accordance with this process.

2. Discussion of the Background

Heat-curable PU powder coatings based on partially or totally blocked polyisocyanates and hydroxyl-containing polymers whose softening point is above 40° C. are part of the prior art and are described in numerous instances in the literature, such as in DE-A 21 05 777, DE-A 25 42 191, DE-A 27 35 497 (U.S. Pat. No. 4,246,380), DE-A 28 42 641, DE-A 30 04 876, DE-A 30 39 824 or DE-A 31 28 743.

PU powder coatings contain essentially a hydroxyl-containing component and a polyisocyanate whose NCO groups are partially or completely masked with a blocking agent, so that the OH/NCO polyaddition reaction is unable to begin at temperatures below 140° C. Only after heating to $\geq 150°$ C. is it possible to bring about the crosslinking of the PU powder coatings to form a coating film within a practical period, with unblocking of the blocking agent and reaction of the OH groups with the NCO groups.

Of the host of blocking agents described in Houben-Weyl, Methoden der organischen Chemie (Methods of organic chemistry), Volume XIV/2, 4th edition, Georg Thieme Verlag, Stuttgart 1963, pages 61–70, only ε-caprolactam has become established in industry for the intended use of the blocked polyisocyanates in the PU powder coatings sector. To crosslink the coating, PU powder coatings based on ε-caprolactam-blocked polyisocyanates require curing temperatures between 170 and 200° C.

There is, therefore, great interest in reducing the high curing temperatures in order to open up the field of powder technology to temperature-sensitive workpieces.

Another matter of interest is the reduction in the curing times, in order to enable an increase in the production rates, i.e. piece rates. In other words, economic as well as ecological factors are of importance.

Attempts have been made to achieve these objectives through the use of oxime-blocked (cyclo)aliphatic polyisocyanates. For example, oxime-blocked polyisocyanates and their use in PU powder coatings are described in DE-A 22 00 342, EP-A 0 432 257 and U.S. Pat. No. 3,857,818. EP-B 0 401 343 describes PU powders in which the hardener component is an acetone oxime-blocked trimethylolpropane/tetra-methylxylylene diisocyanate, while EP-B 0 409 745 specifies, as PU powder hardeners, 2,4-dimethyl-3-pentanone oxime-blocked and 2,6-dimethyl-4-heptanone oxime-blocked isocyanurates of isophorone diisocyanate (IPDI), of methylenebis-4,4'-cyclohexyl isocyanate and of m- and p-tetramethylxylylene diisocyanate.

EP-B 0 531 862 relates to a process for preparing powder coatings having a glass transition temperature of 20–80° C. by mixing A) a polyol component, B) a ketone oxime-blocked polyisocyanate, C) a catalyst component consisting of at least one catalyst for the reaction between blocked NCO groups and hydroxyl groups, and, if desired, D) other auxiliaries and additives known from powder coating technology, the powder coatings being prepared by homogeneously dissolving components A, B, C and if used D, in an inert solvent or solvent mixture having a boiling point or boiling range which is between 50 and 150° C. and then removing the solvent from the resulting solution.

Using oxime-blocked polyisocyanates it is indeed possible to prepare PU powder coatings whose curing temperatures are relatively low. However, a distinction must be made between transparent and pigmented coatings. The relatively high thermal instability of such PU powder coatings has an adverse effect: the coatings tend toward yellowing. A further disadvantage is their high susceptibility to the formation of defects ranging from pinholes to foaming, so that PU powder coatings containing oxime-blocked polyisocyanate are of limited usefulness and can be employed only for thin-film coating.

DE-A 28 12 252 describes 1,2,4-triazole-blocked polyisocyanates which are employed in PU powder coatings and are said to further improve the powder coating binders of the prior art. These compounds are 1,2,4-triazole-blocked diisocyanates and/or the urethane group-carrying polyisocyanates thereof.

DE-A 30 33 860 (EP 0 047 452) describes, on page 2, line 29 to page 3, line 6, that the blocked isocyanato-isocyanurate of hexamethylene diisocyanate (HDI) is unsuitable for use for PU powder coatings. An exception is constituted by the blocked isocyanato-isocyanurate of isophorone diisocyanate (IPDI). As EP 0 047 452 goes on to show, it is possible by cotrimerization of these two polyisocyanates (HDI/IPDI) to prepare products which in their blocked form are suitable (page 8, lines 16–21) for the PU powder coatings sector, although this is not demonstrated experimentally. Reference is made to the variability in the melting range as a function of the molar ratios of HDI/IPDI employed; increased solvent compatibility, low-temperature flexibility, etc., are specified (page 3, lines 19–21).

DE-A 33 22 718 describes blocked isocyanato-isocyanurates of 2-methylpentamethylene diisocyanate/2-ethylbutylene diisocyanate and IPDI cotrimers or mixtures.

SUMMARY OF THE INVENTION

One object of the present invention is to remove the disadvantages of the prior art and in particular to provide PU powder coatings, both transparent and pigmented, which are distinguished above all by a high reactivity and, therefore, permit low curing temperatures, and which despite a high network density possess high flexibility values. Moreover, it should also be possible to attain the thickness of coating which is relevant for PU powder coatings.

This object has been achieved by the PU powder coating of high reactivity of the invention, which comprises:

a) an isocyanate component which is partially or totally blocked with 1,2,4-triazole, b) an hydroxyl-containing polymer, and c) if desired, customary auxiliaries and additives, the isocyanate component containing physical mixtures of individual trimers (isocyanato-isocyanurates) of aliphatic and (cyclo)aliphatic and/or cycloaliphatic diisocyanates.

DETAILED DESCRIPTION OF THE PREFERRED EMBODIMENTS

The polyisocyanates employed in accordance with the invention are physical mixtures of individual isocyanato-isocyanurates (trimers) in the ratios specified.

Compounds to be regarded as polyisocyanates in the context of this application are, in particular, diisocyanates of aliphatic and (cyclo)aliphatic and/or cycloaliphatic structure. Instead of listing individual representatives here, reference is made to the literature; Houben-Weyl, Methoden der organischen Chemie (Methods of organic chemistry), Volume 14/2, p. 61 ff. and J. Liebigs Annalen der Chemie, Volume 562, pp. 75–136. It is generally preferred to employ those diisocyanates which are readily available in industry, i.e. aliphatic diisocyanates such as hexamethylene diisocyanate, (cyclo)aliphatic diisocyanates such as isophorone diisocyanate, and cycloaliphatic diisocyanates such as 4,4'-diisocyanatodicyclohexylmethane. The physical mixtures according to the invention are in each case an aliphatic isocyanate component and at least one representative from the group consisting of (cyclo)aliphatic and cycloaliphatic isocyanate components. The term "(cyclo)aliphatic diisocyanates" is understood by a person skilled in the art to refer to NCO groups which are attached at the same time to cyclic and aliphatic structures, as is the case for example in IPDI.

In contrast, the term "cycloaliphatic diisocyanates" is understood to refer to those having only NCO groups which are attached directly to the cycloaliphatic ring.

The trimers are prepared in a known manner in accordance with the directions of GB-B 13 91 066, DE-A 23 25 826, DE-A 26 44 684 or DE-A 29 16 201. The product is an isocyan-atoisocyanurate with or without higher oligomers and has an NCO content of 12–22% by weight, preferably 14–21.5% by weight, which is reduced by blocking with 1,2,4-triazole to an NCO content of ≦5% by weight, preferably ≦3% by weight, in particular ≦2% by weight.

In accordance with the invention the ratio of NCO groups to blocking agent is 1:0.5 to 1, preferably 1:0.8 to 1.

In accordance with the invention the latent NCO content of the 1,2,4-triazole-blocked polyisocyanates is 9–18% by weight, preferably 11–16% by weight.

The hydroxyl-containing polymers are, in particular, polyesters based on predominantly aromatic dicarboxylic acids, diols and triols in PU powder coatings.

The invention additionally provides for the use of the compositions as powder coatings or as binders for powder coatings for the coating of any desired heat-curable substrate, especially heat-sensitive workpieces, by coating methods which are known per se and are appropriate for the processing of powder coatings. Owing to their high reactivity (low curing temperatures) and their excellent leveling, the transparent PU powder coatings are particularly suitable as a topcoat, especially an automotive topcoat.

With or without the admixing of the additives customary in PU chemistry, the blocked polyisocyanates and the hydroxyl-containing polymers are formulated by means of known technologies to give ready-to-spray powders, are applied by electrostatic means and are baked at between 130 and 250° C., preferably between 140 and 180° C.

The mixing ratio can be varied within wide limits. The best coating characteristics are obtained when the binder ratio is 9–45% by weight crosslinking agent and 55–91% by weight polyester, it being possible to establish an OH/NCO ratio of 1:0.6–1:1.2, preferably 1:0.9–1:1.1. It is particularly advisable to employ one NCO equivalent of the crosslinking agent per OH equivalent of the polyhydroxy compound.

In a preferred embodiment, the isocyanate component is a trimer of hexamethylene diisocyanate, isophorone diisocyanate, 4,4'-diisocyanatodicyclohexylmethane or mixtures thereof. In a particularly preferred embodiment, the ratio of the trimers of hexamethylene diisocyanate to isophorone diisocyanate and/or 4,4'-diisocyantodicyclohexyl-methane is from 90:10% by weight to 10:90% by weight, preferably 75:25% by weight to 25:75% by weight, more preferably 60:40% by weight to 40:60% by weight.

In order to carry out the blocking reaction, the isocyanate component is introduced initially into the reaction vessel and the blocking agent is added in portions. The reaction takes place at temperatures below the unblocking temperature at 90–130° C., preferably between 100 and 120° C. It is also possible to add the catalysts customary in PU chemistry for the isocyanate polyaddition reaction, in an amount of 0.001–1% by weight, based on the overall mixture.

The solvent-free blocking reaction can be carried out either discontinuously in a reactor or continuously in a static mixer or, advantageously, in a multiscrew extruder, especially a twin-screw extruder.

In order to prepare the novel binders for PU powder coatings and/or the PU powder coatings themselves, use is made of the customary resins of PU powder coatings, preferably hydroxyl-containing polyesters.

Preferred hydroxyl-containing polyesters are those having a weight average molecular weight of 800–10,000, preferably 1200–5000, a hydroxyl number of 20–150 mg of KOH/g, preferably 30–100 mg of KOH/g, and melting points above 60° C., preferably between 70 and 100° C. Polyesterpolyols of this kind are described, for example, in DE-A 19 57 483, DE-A 25 42 191, DE-A 30 04 876 and DE-A 31 43 060.

The hydroxyl-containing polyesters are employed in amounts such that the OH/NCO ratio is 1:0.6–1:1.2, preferably 1:0.9–1:1.1.

In order to increase the gelling rate of the heat-curable powder coatings it is possible to add catalysts. Catalysts include organotin compounds, such as dibutyltin dilaurate (DBTL), Sb(II) octoate, dibutyltin maleate, etc. The amount of catalyst added is 0.1–5 parts by weight per 100 parts by weight of the hydroxyl-carrying polyester.

To prepare PU powder coatings, the isocyanate component is mixed with the appropriate hydroxyl-containing polymer and, if desired, with catalysts and also pigments and customary auxiliaries such as fillers and leveling agents, for example silicone fluid or acrylate resins, and the mixture is homogenized in the melt. This can be carried out in suitable equipment such as heatable kneading apparatus, but preferably by extrusion, in the course of which an upper temperature limit of 120° C. should not be exceeded. After cooling to room temperature and appropriate comminution, the extruded mass is ground to form the ready-to-spray powder. The ready-to-spray powder can be applied to appropriate substrates by the known techniques, for example electrostatic spraying, fluidized-bed sintering, or electrostatic fluidized-bed sintering. Following the application of the powder, the coated workpieces are heated for full curing for between 60 and 4 minutes at a temperature of from 130 to 200° C., preferably for between 25 and 5 minutes at from 140 to 180° C.

Substrates suitable for coating with the novel pulverulent coating compositions are all those which withstand the stated curing conditions without impairment of their mechanical properties, examples being metals, glass, ceramic, plastic or wood.

In comparison with the known PU powder coatings, those obtained are distinguished by improved behavior in relation to heat, UV light and chemical influences; the transparent coatings exhibit, in particular, outstanding leveling.

EXAMPLES

A. Preparation of the 1,2,4-triazole-blocked isocyanato-isocyanurate mixtures General Preparation procedure The isocyanurates employed in accordance with Table 1 were homogenized in a jacketed reactor at 100–120° C. Prior to the addition of 1,2,4-triazole, the NCO content of the melt was determined by titrimetry and then the calculated amount of 1,2,4-triazole was added in portions such that the reaction temperature did not exceed 130° C. Following the addition of 1,2,4-triazole, the reaction mixture was stirred further at 120° C. until the NCO content had fallen to below the calculated values or <0.5% by weight.

If, optionally, dibutyltin dilaurate (DBTL) was required in order to accelerate the reaction, it was added after homogenizing the isocyanurate or before adding the blocking agent.

Use was made of the industrially available isocyanurates, for example of

| (A) | Hüls AG VESTANAT T 1890 | NCO content: 17.3 ± 0.3, |
| (B) | Bayer AG DESMODUR N 3300 | NCO content: 21.8 ± 0.3, and |
| (C) | the laboratory product W 1600 of 4,4'-diisocyanatodicyclo-hexylmethane | NCO content: 12.6 ± 0.3. |

TABLE 1

1,2,4-Triazole-blocked isocyanurate mixtures

| Example | Composition (% by weight) | | | | | | NCO Content (% by weight) | | Melting range (° C.) | Glass Transition temperature (° C.) |
|---|---|---|---|---|---|---|---|---|---|---|
| | A | Isocyanurate/NCO % | | Amount | 1,2,4-triazole | | free | total | | |
| 1 | A | B | — | 18.1 | 77.0 | 23.0 | 0.4 | 13.7 | 103–107 | 70–89 |
| 2 | A | B | — | 18.6 | 76.7 | 23.3 | 0.5 | 13.9 | 96–99 | 62–82 |
| 3 | A | B | — | 18.5 | 80.4 | 19.6 | 2.7 | 14.5 | 90–93 | 59–78 |
| 4 | A | B | — | 18.9 | 76.3 | 23.7 | 0.4 | 14.1 | 85–88 | 51–71 |
| 5 | A | B | — | 18.9 | 78.1 | 21.9 | 1.3 | 14.4 | 84–86 | 49–70 |
| 6 | A | B | — | 18.9 | 80.1 | 19.9 | 2.8 | 14.9 | 80–83 | 51–68 |
| 7 | A | B | — | 19.4 | 75.8 | 24.2 | 0.2 | 14.5 | 71–74 | 41–57 |
| 8 | — | B | C | 16.2 | 79.0 | 21.0 | 0.3 | 12.6 | 69–71 | 38–56 |
| 9 | — | B | C | 15.3 | 79.9 | 20.1 | 0.4 | 12.0 | 78–82 | 50–65 |
| 10 | — | B | C | 15.3 | 81.8 | 18.2 | 1.2 | 12.1 | 76–80 | 48–64 |
| 11 | — | B | C | 14.4 | 80.8 | 19.2 | 0.3 | 11.3 | 86–90 | 53–69 |
| 12 | — | B | C | 14.4 | 84.8 | 15.2 | 2.8 | 12.0 | 80–84 | 49–66 |
| 13 | A | B | C | 17.2 | 77.9 | 22.1 | 0.5 | 13.0 | 67–72 | 34–51 |
| 14 | A | B | C | 18.1 | 77.1 | 22.9 | 0.4 | 13.5 | 86–92 | 53–68 |
| 15 | A | B | C | 17.2 | 77.9 | 22.1 | 0.3 | 13.1 | 89–92 | 56–70 |
| 16 | A | B | C | 17.6 | 77.5 | 22.5 | 0.3 | 13.4 | 74–79 | 45–59 |

B. Polyol Component

General Preparation Procedure

The starting components, i.e. terephthalic acid (TA), dimethyl terephthalate (DMT), 1,6-hexanediol (HD), neopentyl glycol (NPG), 1,4-dimethylolcyclohexane (DMC) and trimethylolpropane (TMP), were placed in a reactor and heated with the aid of an oil bath. After the substances had predominantly melted, 0.5% by weight of di-n-butyltin oxide was added as catalyst at a temperature of 160° C. The first elimination of methanol occurred at a temperature of about 170° C. The temperature was raised to 220–230° C. over the course of 6 to 8 hours and the reaction was brought to an end over the course of a further 12 to 15 hours. The polyester was cooled to 200° C. and was substantially freed from volatile fractions over the course of 30 to 45 minutes by applying a vacuum (1.33 mbar). Throughout the reaction period, the bottom product was stirred and a gentle stream of $N_2$ was passed through the reaction mixture.

Table 2 shows polyester compositions and commercial polyesters with the corresponding physical and chemical characteristics.

TABLE 2

Polyesters

| | Starting Components | | | | | | Chemical and physical characteristics | | | | Viscosity |
|---|---|---|---|---|---|---|---|---|---|---|---|
| Example B | TA (mol) | DMT (mol) | HD (mol) | NPG (mol) | DMC (mol) | TMF (mol) | OH number (mg KOH/g) | Acid No. (mg KOH/g) | m.p. (° C.) | DTA (° C.) | at 160° C. (mPa · s) |
| 1 | 10 | 10 | 6.25 | 10.5 | 2 | 2.9 | 55–60 | 3–4 | about 75 | about 50 | ≈25,000 |
| 2 | CRYLCOAT ® 280 UCB/Belgium | | | | | | ≈50 | <10 | 100 ± 8 | 55 ± 8 | — |
| 3 | URALAC P 1460 DSM/Netherlands | | | | | | 38–41 | 4–4.5 | 70–75 | 50 | 40,000 |
| 4 | ALFTALAT AN 739 Hoechst/Italy | | | | | | 55–60 | 2–4 | 82–90 | >50 | 24–29,000 |

C. Polyurethane powder coatings

General preparation Procedure

The comminuted products, i.e. blocked polyisocyanates (cross-linking agents), polyesters, leveling agent masterbatch and, if used, catalyst masterbatch, were intimately mixed, together if desired with the white pigment, in an edge runner mill and the mixture was then homogenized in an extruder up to a maximum temperature of 130° C. After cooling, the extrudate was fractionated and milled with a pinned-disk mill to a particle size of <100 μm. The powder thus prepared was applied using an electrostatic powder spraying unit at 60 kV to degreased, optionally pretreated iron panels which were then baked in a convection oven at temperatures between 150 and 180° C.

Leveling agent masterbatch

10% by weight of the leveling agent, i.e. a commercially available copolymer of butyl acrylate and 2-ethylhexyl acrylate, was homogenized in the melt in the appropriate polyester, and after the mixture had solidified it was comminuted.

Catalyst masterbatch

5% by weight of the catalyst, i.e. DBTL, was homogenized in the melt in the appropriate polyester, and after the mixture had solidified it was comminuted.

The abbreviations in the tables below have the following meanings:

CT=Coating thickness in μm
EI=Erichsen indentation in mm (DIN 53 156)
CH=Crosshatch test (DIN 53 151)
GG 60° ∢=Gardner gloss measurement (ASTM-D 5233)
Imp. rev.=Impact reverse in g•m
HK=König hardness in sec (DIN 53 157)

Obviously, numerous modifications and variations of the present invention are possible in light of the above teachings. It is therefore to be understood that, within the scope of the appended claims, the invention may be practiced otherwise than as specifically described herein.

The German priority application no. 196 11 821.2, filed Mar. 26, 1996 is incorporated herein by reference in its entirety.

TABLE 3

Pigmented powder coatings

| | Example C1 | | | | | | | | | | | |
|---|---|---|---|---|---|---|---|---|---|---|---|---|
| Formulation | 1 | 2 | 3 | 4[x] | 5[xx] | 6 | 7 | 8 | 9 | 10[x] | 11 | 12[o] |
| Crosslinking agent A | 23.49 | 24.16 | 23.23 | 23.23 | 19.49 | 20.30 | 19.76 | 23.65 | 22.74 | 22.74 | 17.47 | 14.48 |
| Table 1 Example ( ) | (2) | (4) | (4) | (4) | (4) | (5) | (6) | (7) | (7) | (7) | (7) | (7) |
| Polyester B1 | — | 75.84 | — | — | — | — | — | 76.35 | — | — | — | — |
| Polyester B2 | — | — | — | — | — | 79.70 | 80.24 | — | — | — | — | — |
| Polyester B3 | 76.51 | — | 76.77 | 76.77 | 80.51 | — | — | — | 77.26 | 77.26 | — | — |
| Polyester B4 | — | — | — | — | — | — | — | — | — | — | 82.53 | 85.52 |
| Notes | All formulations contain 40% by weight of TiO$_2$ (white pigment) and 0.5% by weight each of leveling agent and benzoin; the OH/NCO ratio is 1:1, [o]1:0.8; [x]0.1% by weight of DBTL | | | | | | | | | | | |
| Coatings data | | | | | | | | | | | | |
| CT | 75–83 | 58–71 | 60–71 | 72–83 | 72–87 | 67–76 | 71–83 | 55–67 | 61–74 | 58–72 | 57–69 | 63–77 |
| GG 60°∠ | 90–91 | 90 | 90–91 | 90–91 | 90–91 | 90 | 90 | 90 | 89–90 | 89–90 | 90 | 90 |
| CH | 0 | 0 | 0 | 0 | 0 | 0 | 0 | 0 | 0 | 0 | 0 | 0 |
| EI | >10 | >10 | >10 | >10 | >10 | >10 | >10 | >10 | >10 | >10 | >10 | >10 |
| Imp. rev. | 576 | 691.2 | 806.4 | 806.4 | 806.4 | 806.4 | 691.2 | 806.4 | 576 | 691.2 | 691.2 | 576 |
| Notes | Curing conditions: 180° C./6–8', 170° C./10–12', 160° C./20–25', 150° C./30' | | | | | | | | | | | |

TABLE 4

Pigmented powder coatings

| Formulation | Example C1 | | | | | | | | | | | |
|---|---|---|---|---|---|---|---|---|---|---|---|---|
| | 13 | 14 | 15 | 16 | 17[x] | 18 | 19 | 20[o] | 21 | 22 | 23 | 24[ox] |
| Crosslinking agent A | 25.98 | 22.55 | 23.41 | 26.22 | 26.22 | 27.41 | 21.36 | 17.85 | 20.37 | 25.53 | 24.57 | 20.67 |
| Table 1 Example ( ) | (8) | (8) | (9) | (9) | (9) | (11) | (11) | (11) | (12) | (15) | (15) | (15) |
| Polyester B1 | 74.02 | — | — | — | — | — | — | — | — | 74.47 | — | — |
| Polyester B2 | — | 77.45 | 76.59 | — | — | — | — | — | 79.63 | — | — | — |
| Polyester B3 | — | — | — | 73.78 | 73.78 | 72.59 | — | — | — | — | 75.43 | 79.33 |
| Polyester B4 | — | — | — | — | — | — | 78.64 | 82.15 | — | — | — | — |
| Notes | All formulations contain 40% by weight of TiO$_2$ (white pigment) and 0.5% by weight each of leveling agent and benzoin; the OH/NCO ratio is 1:1, [o]1:0.8; [x]0.1% by weight of DBTL | | | | | | | | | | | |
| Coatings data | | | | | | | | | | | | |
| CT | 65–76 | 63–77 | 71–84 | 60–70 | 66–74 | 61–75 | 73–87 | 69–81 | 68–80 | 62–75 | 67–85 | 63–77 |
| GG 6°∠ | 89/90 | 90 | 89–90 | 89–90 | 89 | 89 | 89–90 | 89–90 | 90 | 90–91 | 90 | 90 |
| CH | 0 | 0 | 0 | 0 | 0 | 0 | 0 | 0 | 0 | 0 | 0 | 0 |
| EI | >10 | >10 | >10 | >10 | >10 | >10 | >10 | >10 | >10 | >10 | >10 | >10 |
| Imp. rev. | 691.2 | 576 | 576 | 806.4 | 806.4 | 576 | 691.2 | 691.2 | 806.4 | 691.2 | 576 | 806.4 |
| Notes | Curing conditions: 180° C./6–8', 170° C./10–12', 160° C./20–25', 150° C./30' | | | | | | | | | | | |

C2 Transparent powder coatings

The process described was also used to prepare and apply the transparent powder coatings, which were baked between 140 and 180° C.

TABLE 5

| Formulation | Example C2 | | | | | | | | | | | |
|---|---|---|---|---|---|---|---|---|---|---|---|---|
| | 1 | 2 | 3[x] | 4 | 5 | 6[xo] | 7 | 8[o] | 9 | 10 | 11[o] | 12 |
| Crosslinking agent A | 23.49 | 23.23 | 23.23 | 23.65 | 22.74 | 19.06 | 17.47 | 14.48 | 26.22 | 21.36 | 17.85 | 24.57 |
| Table 1 Example ( ) | (2) | (4) | (4) | (7) | (7) | (7) | (7) | (7) | (9) | (11) | (11) | (15) |
| Polyester B1 | — | — | — | 76.35 | — | — | — | — | — | — | — | — |
| Polyester B3 | — | — | — | — | 77.26 | 80.94 | — | — | 73.78 | — | — | 75.43 |
| Polyester B4 | 76.51 | 76.77 | 76.77 | — | — | — | 82.53 | 85.52 | — | 78.64 | 82.15 | — |
| Notes | All formulations contain 0.5% by weight of leveling agent and 0.3% by weight of benzoin; the OH/NCO ratio is 1:1, [o]1:0.8; [x]0.1% by weight of DBTL | | | | | | | | | | | |
| Coatings data | | | | | | | | | | | | |
| CT | 70–81 | 67–79 | 60–70 | 57–70 | 65–81 | 59–71 | 65–75 | 60–70 | 57–71 | 64–80 | 66–79 | 61–74 |
| HK | 199 | 204 | 207 | 197 | 203 | 200 | 199 | 201 | 200 | 196 | 199 | 195 |
| CH | 0 | 0 | 0 | 0 | 0 | 0 | 0 | 0 | 0 | 0 | 0 | 0 |
| EI | >10 | >10 | >10 | >10 | >10 | >10 | >10 | >10 | >10 | >10 | >10 | >10 |
| Notes | Curing conditions: 180° C./5', 170° C./7–10', 160° C./15', 150° C./20–25', 140° C./25–30' | | | | | | | | | | | |

What is claimed as new and desired to be secured by Letters Patent of the United States is:

1. A heat curable polyurethane powder coating composition, comprising
    a) an isocyanate component which is partially or totally blocked with 1,2,4-triazole and
    b) an hydroxyl-containing polymer,
    wherein said isocyanate component consists essentially of a physical mixture of isocyanato-isocyanurate (trimers) of (1) an aliphatic diisocyanate and (2) a (cyclo) aliphatic and/or cycloaliphatic diisocyanate with or without higher oligomers of the diisocyanates, having an NCO content of 12 to 22% by weight,
       wherein the term (cyclo) aliphatic diisocyanate designates a diisocyanate in which one NCO group is attached directly to a cycloaliphatic structure and one NCO group is attached directly to an aliphatic structure in the diisocyanate and the
    term cycloaliphatic diisocyanate designates a diisocyanate having only NCO groupss which are attached directly to a cycloaliphatic ring in the diisocyanate.

2. The composition of claim 1, wherein said isocyanate component consists essentially of a physical mixture of the trimers of (a) hexamethylene diisocyanate, and (b) isophorone diisocyanate, and/or 4,4'-diisocyanatodicyclohexylmethane or mixtures thereof.

3. The composition of claim 2, wherein the ratio of said trimers of hexamethylene diisocyanate to isophorone diisocyanate and/or 4,4'-diisocyanatodicyclohexylmethane is from 90:10 wt. % to 10:90 wt. %.

4. The composition of claim 3, wherein said ratio is from 75:25 wt. % to 25:75 wt. %.

5. The composition of claim 3, wherein said ratio is from 60:40 wt. % to 40:60 wt. %.

6. The composition of claim 1, wherein said isocyanate component has an NCO content of 14–21.5% by weight.

7. The composition of claim 1, wherein said isocyanate component is blocked such that there is 0.5–1 mol of 1,2,4-triazole per equivalent of isocyanate.

8. The composition of claim 7, wherein said isocyanate component is blocked such that there is 0.8–1 mol of 1,2-4-triazole per equivalent of isocyanate.

9. The composition of claim 1, wherein the latent NCO content is 9–18% by weight, and the free NCO content is ≦5% by weight.

10. The composition of claim 9, wherein the latent NCO content is 11–16% by weight.

11. The composition of claim 9, wherein the the free NCO content is ≦3% by weight.

12. The composition of claim 11, wherein the free NCO content is ≦2% by weight.

13. A method of coating a substrate comprising the steps of:

coating a substrate with the polyurethane powder coating composition of claim 1 to form a powder coating; and heat curing said powder coating.

14. The method of claim 13, wherein said heat curing is conducted at a temperature from 130 to 200° C.

15. The method of claim 14, wherein said heat curing is conducted at a temperature of 140–180° C.

16. The method of claim 14, wherein said heat curing is conducted for 4–60 minutes.

17. The method of claim 16, wherein said heat curing is conducted for 5–25 minutes.

18. The method of claim 14, wherein said substrate is selected from the group consisting of metal, glass, ceramic, plastic and wood.

19. An automotive top coat prepared by the process of claim 14.

20. The composition of claim 1 containing a catalyst to increase the gelling rate of the polyurethane powder coating composition and optionally a pigment, filler and/or a leveling agent.

* * * * *